United States Patent [19]

Yakimowich et al.

[11] 4,208,197

[45] Jun. 17, 1980

[54] AIR PRECLEANER

[75] Inventors: Peter Yakimowich, Clarkston; Paul E. Verkerke, Pontiac, both of Mich.

[73] Assignee: General Motors Corporation, Detroit, Mich.

[21] Appl. No.: 919,258

[22] Filed: Jun. 26, 1978

[51] Int. Cl.² .................................................. B01D 50/00
[52] U.S. Cl. ..................... 55/315; 55/385 B; 55/392; 55/395; 55/396; 55/439; 55/450; 55/459 D; 296/1 S
[58] Field of Search ............... 55/315, 342, 385 R, 55/385 B, 429, 450, 459 R, 459 B, 459 D, DIG. 28, 392, 461, 278, 306, 307, 356, 529, 395–396, 439; 296/1 S, 137 J

[56] References Cited

U.S. PATENT DOCUMENTS

| | | | |
|---|---|---|---|
| 1,103,549 | 7/1914 | Spencer | 55/450 |
| 2,299,332 | 10/1942 | Marshall, Jr. | 55/429 |
| 2,708,920 | 5/1955 | Pasturczak | 55/385 B X |
| 3,306,461 | 2/1967 | Weis | 55/459 D X |
| 3,972,556 | 8/1976 | Mason, Jr. | 296/1 S |
| 4,018,472 | 4/1977 | Mason, Jr. | 296/1 S |

FOREIGN PATENT DOCUMENTS 1088435 3/1955 France ........................................ 55/461

Primary Examiner—Kathleen J. Prunner
Attorney, Agent, or Firm—R. L. Phillips

[57] ABSTRACT

An air introduction assembly for a vehicle engine located with respect to a roof mounted air deflecting member to perform an air cleaning or contaminant separating function. The air inlet is placed in a plane substantially parallel to the surface of the deflector over which air flows during vehicle movement and opens normally to the direction of the air flow. Air passing thereover which enters the inlet must be diverted in an arcuate path which causes contaminant particles to pass the inlet. The air inlet is partially defined by a forward peripheral edge portion offset outward from the surface of the air deflector so that a moving contaminant-laden layer of air immediately adjacent the deflector surface is excluded from entering into the inlet. Leading from the inlet is an air passage which tangentially introduces the air entering the inlet into a cylindrical separator chamber. This air passage converges in the direction of air flow so as to accelerate the air flow prior to its entry into the separator chamber.

3 Claims, 4 Drawing Figures

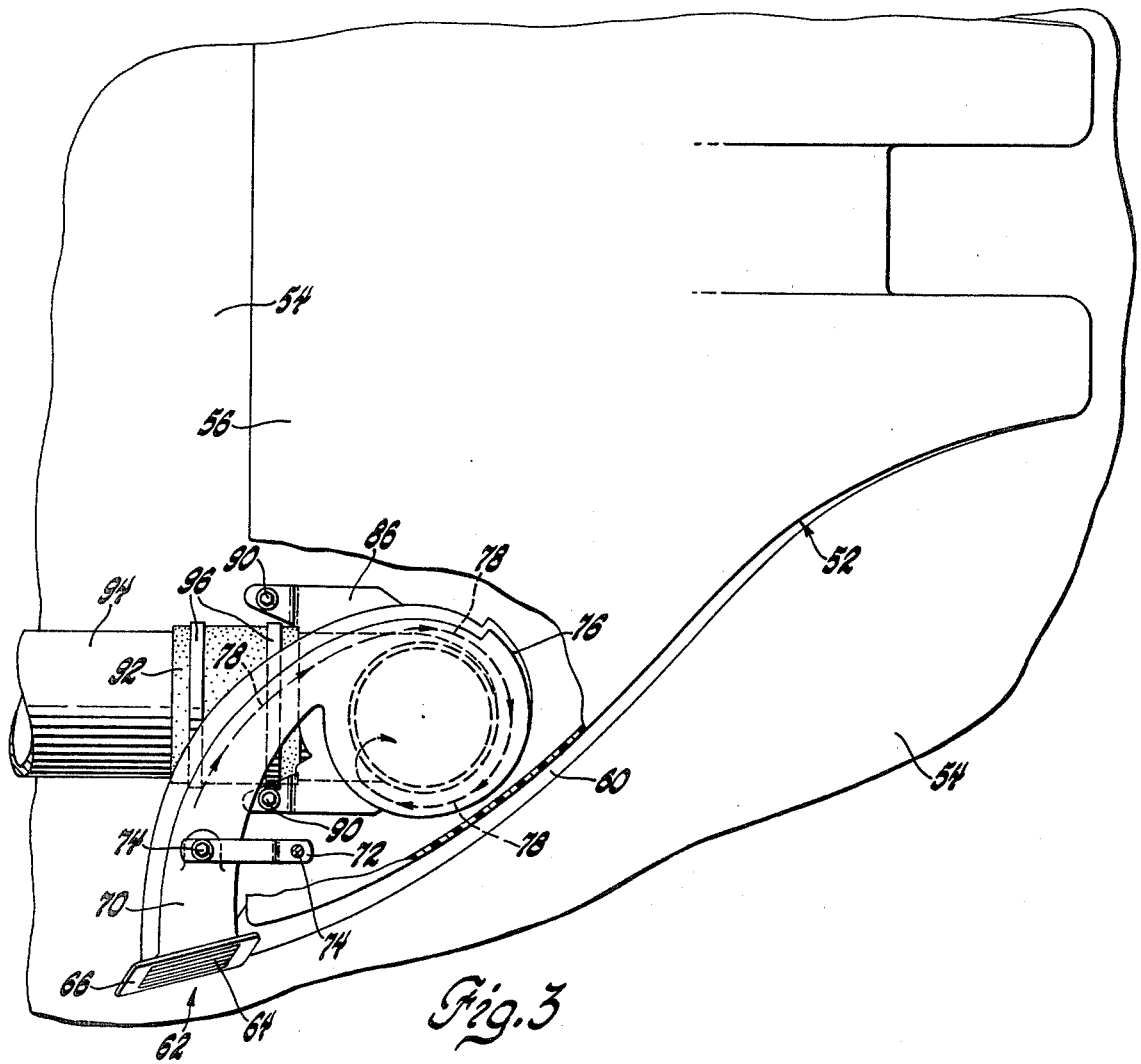
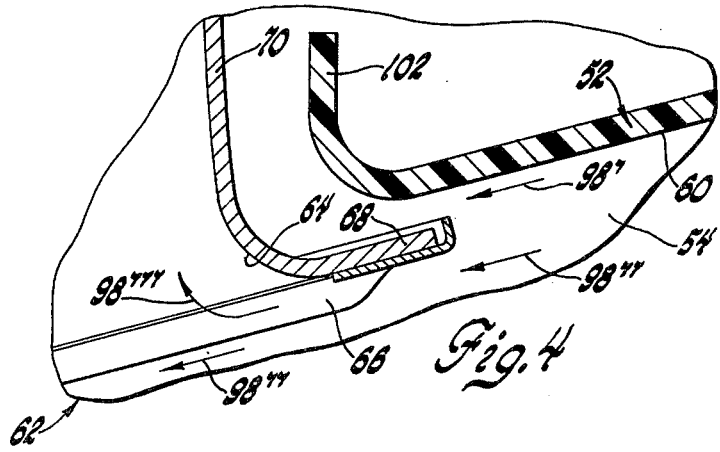

AIR PRECLEANER

This invention relates to air introduction assemblies for vehicle engines and particularly for vehicles with a roof mounted air deflector with surfaces over which air rapidly flows. The air inlet is positioned downstream from an air deflecting surface with the plane of the inlet generally parallel to air flow but offset outward from the deflector surface so that a thin contaminant-laden layer of air adjacent the surface is excluded from the inlet.

A short period of time ago, it was discovered that truck type vehicles hauling trailers may be made more fuel efficient by providing a roof mounted air deflector on the truck. The deflector is generally characterized by a wedge shaped structural member having surfaces over which air rapidly flows prior to passing the rear edge portion of the deflector. Prior to the use of a deflector on truck type vehicles, the air intake for the vehicle engine was a vertically extending stack having a simple cover member thereon thereby causing air to enter the stack in an upward direction and then reverse directions as it passed through the tubular member to the engine. It has been found that with the use of air deflectors, air flow in the vicinity of the truck roof passes radially upward as well as rearward. It has been found that the air disturbances undesirably influence the intake of air in the conventional manner.

The present invention relates to an air inlet and introduction assembly for a truck cab type vehicle with a roof mounted air deflecting member. Air flow over the deflector attains a higher velocity than the vehicle speed would otherwise indicate. Immediately downstream of an edge of the deflector is located an air inlet which has a generally planar configuration extending normal to the air deflector surface but offset from the plane of the surface. This offset relationship causes a contaminant and moisture laden layer of air flowing immediately adjacent the deflector surface to be excluded from the inlet. The air inlet opening extends in a plane parallel to the air flow so that air entering the inlet is deflected to an arcuate path from air flowing thereby and this reduces the entry of contaminants and water droplets.

Another feature of the air inlet and contaminant separator assembly is the provision of a converging air passage extending from the air inlet. The air passage terminates and discharges air tangentially into a circular separator chamber. An outlet from the separator chamber is directed through the bottom wall thereof and is centrally located so that air flowing in the chamber first circulates spirally along the wall and subsequently moves radially inward and downward through the outlet. An opening near the periphery of the chamber's interior is spaced radially outward from the outlet and located circumferentially downstream from the inlet. Contaminants which drop out of the decelerating air flow in the separator chamber are collected by passage therethrough.

Accordingly, a feature of the present invention is to provide an air introduction assembly for a vehicle with a roof mounted air deflector and including an air inlet grill portion in a plane generally parallel to air flowing over the air deflector surfaces so that air entering the grill must curve in an arcuate path into the inlet.

A further feature of the present invention is to provide an engine air introduction for use in association with a vehicle roof mounted air deflector in which the assembly includes an air inlet grill portion positioned in a plane generally parallel to air flow over the deflector surfaces and offset outward from a surface of the deflector so that the relatively thin layer of contaminant and moisture laden air flowing next to the surface of the deflector is excluded from the inlet.

Further features and advantages of the present invention will be more readily apparent from the following detailed description, reference being had to the accompanying drawings in which a preferred embodiment is illustrated.

In the Drawings

FIG. 3 is a planar and partially sectioned view of the air deflector and separator assembly shown in FIG. 2 taken along section line 3—3 and looking in the direction of the arrows; and FIG. 4 is an enlarged sectional view taken along section line 4—4 in FIG. 2 and looking in the direction of the arrows.

Figure 1:
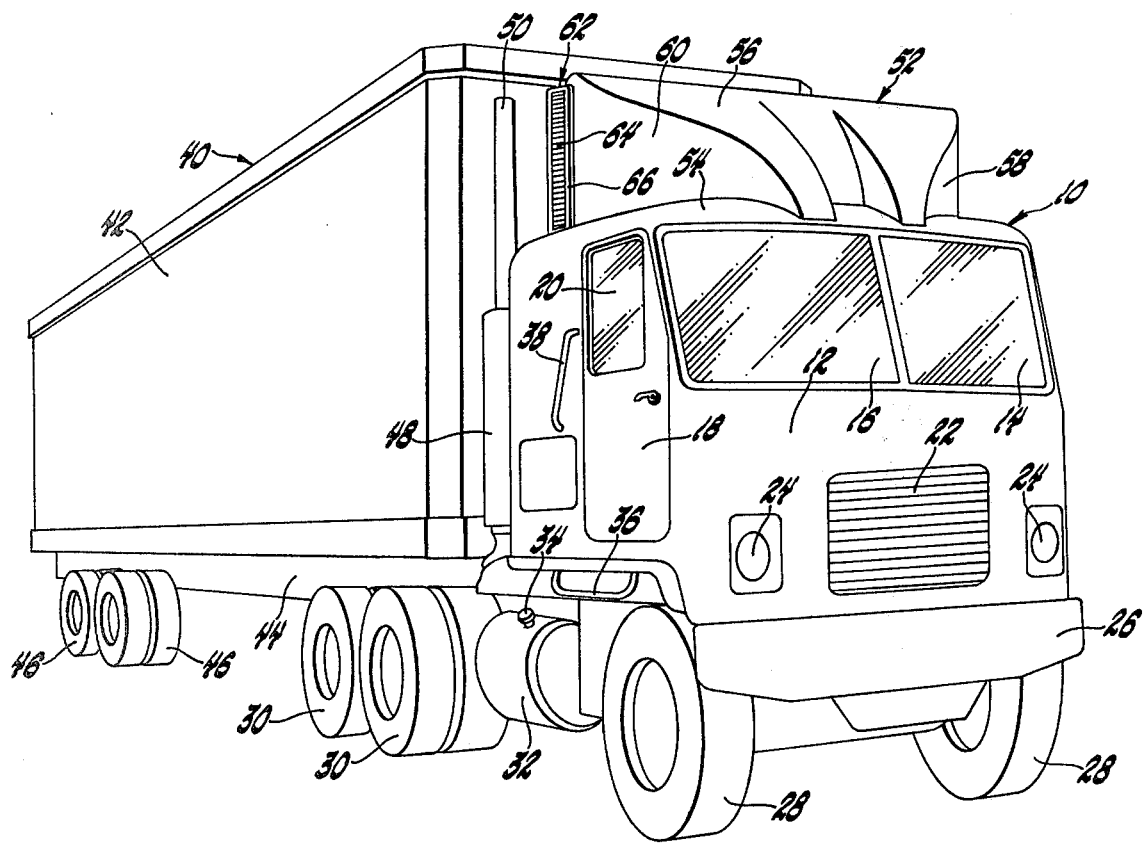
FIG. 1 is a perspective view of a cab-over type truck connected to a trailer therebehind.

In FIG. 1, a cab-over type truck or vehicle 10 is illustrated. Vehicle 10 includes body 12 incorporating windshield portions 14, 16 and a righthand door assembly 18 including a window portion 20. A lefthand door assembly is also a part of the truck 10 but is not visible in FIG. 1. A grill opening 22 is located ahead of an engine cooling radiator (not visible). Headlights 24 are mounted on front of the vehicle body 12 above a front bumper 26. The body 12 is secured to a frame which is supported by wheel assemblies which include front wheels 28 and a pair of wheel and axle assemblies 30. Other features of the vehicle 10 include a side mounted fuel tank 32 with a filler opening and cap assembly 34. A rod-type step assembly 36 and handle 38 are included to assist entry to the door assembly 18. The truck 10 is illustrated in connected relationship to a trailer assembly 40 which includes enclosure body 42 resting upon a frame assembly 44. Frame 44 is attached to wheel and axle assemblies 46. Vehicle 10 also includes an engine exhaust system including vertically oriented muffler 48 and exhaust pipe 50.

In recent years, it has been uncovered that fuel economy of vehicles hauling trailers is enhanced by providing an air deflecting assembly 52 mounted on the roof portion 54. The air deflector 52 is configured to cause air to flow over a top surface 56 and along side surfaces 58, 60. The air deflector 52 is normally a thin-walled, hollow structure which may be conveniently made of fiberglass-reinforced material. For more details on the structure of a particularly desirable deflector, reference is hereby made to U.S. Pat. No. 4,018,472 which was issued Apr. 19, 1977, to William T. Mason, and is assigned to the General Motors Corporation.

The air deflector 52 reduces drag normally resulting from the difference in height between the roof levels of the vehicle 10 and the trailer 40. Air flowing over the surfaces 56, 58 and 60 of the deflector increases to a velocity greater than the vehicle velocity would otherwise suggest.

Normally the engine utilized by vehicles of this type illustrated in a Diesel engine. However, some gasoline engines are used. In either case, the engines require large quantities of clean air to support the combustion.

Although air cleaners are used to clean air before entry to the engine, it is desirable to introduce clean and dry air to the inlet system. The subject invention relates to an air inlet and a contaminant and water separator assembly 62 which is mounted on the roof portion 54 and mainly under deflector 52. In FIG. 1, only an air inlet forming grill portion 64 of a louvered grill assembly 66 of the assembly 62 is visible and for more details reference is made to FIGS. 2–4.

Figure 2:
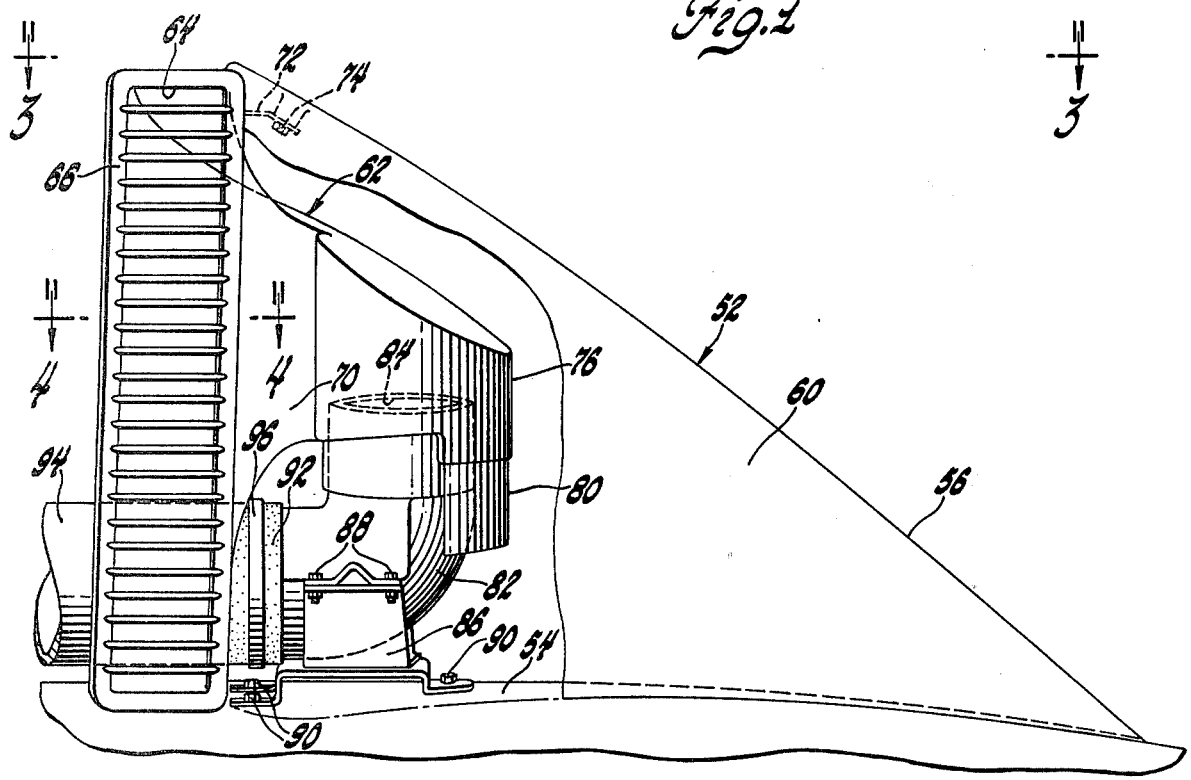
FIG. 2 is an elevational side view of the air deflector shown in FIG. 1 partially broken away to reveal the air inlet and separator assembly.

The inlet 64 is an elongated vertically oriented opening and is framed by outturned peripheral edge portion 68 of the grill assembly extending generally in a plane parallel to air flow surface 60. As shown in FIGS. 2 and 3, opening 64 is formed as part of duct assembly 70 which is partially supported in relation to the deflector 52 by a bracket member 72 and fasteners 74. The duct assembly 70 extends laterally with respect to vehicle 10 from inlet opening 64. The duct 70 terminates at a cylindrical separator portion 76 and forms a converging flow path for air passing from the inlet 64 to the interior of separator 76. Resultantly, air passing from the inlet 64 is accelerated prior to entry into the interior of separator 76.

The air entering cylindrical separator 76 follows a generally circular path along the walls or circumference of the separator interior as shown by arrows 78 in FIG. 3. As the air flows along the inner wall it is decelerated. Resultantly, any moisture and/or contaminants carried by the air stream are separated therefrom by gravitational action as the air velocity decreases. A collector or holding portion 80 is provided for reception of water droplets and contaminants. Portion 80 is removable from the separator assembly 76 for cleaning.

Extending upwardly through the bottom wall of the separator 76 is an outlet elbow or fitting 82 for discharge of clean air therefrom. An open end 84 of elbow 82 extends upward slightly from the bottom wall so that moisture or contaminants collected on the bottom can not enter. Elbow 82 is attached to the vehicle roof by a bracket assembly 86 which is connected to the elbow 82 by fasteners 88 and to the roof portion 54 by fasteners 90. To deliver air to the engine, elbow 82 is connected by a rubber tubular member 92 to tubular conduit means 94 which extends across the roof 54 and then downward behind the truck 10 to the engine. The tubular connector member 92 is fastened to the elbow 82 and to the conduit 94 by metal band or clamp members 96.

As shown in FIG. 4, air passing over the surface 60 is indicated by arrows 98' and 98". The designation 98' indicates air flow relatively close to surface 60 of the deflector. Designation 98" represents air flow further outward from the surface 60. It has been noted that the air flow 98' adjacent to the surface 60 generally contained a greater quantity of moisture and contaminants than the air 98" outward from the surface. It should be noted, of course, that the representation of air flow is greatly simplified in FIG. 4 and that there may be turbulent flow or swirling as the air flows along surface 60 and over inlet 64. The air inlet forming duct 70 is located slightly to the rear of the edge 102 of deflector 52. The peripheral edge 68 of the duct forming inlet 64 is offset outward from surface 60. This offset may vary from an eighth of an inch to one-quarter of an inch because of variances in the molded structure of the side wall 60, and particularly the rear edge 102 thereof. Occasionally during testing, the offset or gap between the portion 68 of the duct 70 and the surface 60 was found to be as much as a half an inch. This wide offset did not appear to greatly affect the operation of the air intake in excluding water droplets and contaminants from entry to inlet opening 64.

In operation, the air layer 98' adjacent to surface 60 passes between portion 68 and the surface 60 and resultantly is excluded from inlet 64. The air flow 98" which is spaced outward from the edge 68 flows in substantially the same plane as the opening 64 which is formed by the edge portion 68. Thus, air flow entering the inlet 64 must take an arcuate path as represented by numeral 98'''. This curved path tends to separate moisture droplets and contaminants carried along with the air flow 98". The heavier contaminant particles and moisture droplets tend to follow the direction of arrow 98" while the lighter clean air portion easily makes the curved transition. Once air enters duct 70, its velocity is increased by the converging portion thereof upstream from the cylindrical separator portion 76. The air flow designation 78 in FIG. 3 shows air flows to the separator and then circumferentially along the inner wall of the separator while flow velocity decreases. Simultaneously, contaminants and moisture droplets drop out of the air stream prior to flow of air radially inward and then downward through open end 84 of the elbow 82.

Although only one embodiment of the subject invention has been illustrated and discussed in detail, modifications are easily visualized and may be contemplated without falling outside the scope of the invention as defined by the following claims.

What is claimed is:

1. In combination with a vehicle having an engine and a roof mounted air deflector, an air inlet assembly providing an air passage for introducing air relatively free of contaminants and moisture to the engine, said air passage having an inlet that is positioned at a predetermined distance outward from the surface of the deflector and is oriented so as to direct air from the air stream flowing past the deflector into said air passage in a direction substantially normal to the air stream to thereby exclude from said air passage that layer of air flowing immediately adjacent the surface of the deflector having a relatively large amount of contaminants and moisture as compared with the air flow outward thereof and whereby the contaminants and moisture droplets in the air that is permitted to enter said air passage tends to separate therefrom prior to such entry, said air passage further having a converging section leading from said inlet to accelerate the air flow in said air passage, and said air passage further having a circular section joined with said converging section so as to direct air flow therefrom into a circular path to decelerate the air flow in said air passage and cause contaminants and moisture droplets contained therein to move radially outward and thereby separate from the air prior to introduction of the air through said air passage to the engine.

2. In combination with a vehicle having an engine and a roof mounted air deflector, an air inlet assembly providing an air passage for introducing air relatively free of contaminants and moisture to the engine, said air passage having an inlet that is positioned at a predetermined distance outward from the surface of the deflector and is oriented so as to direct air from the air stream flowing past the deflector into said air passage in a direction substantially normal to the air stream to thereby exclude from said air passage that layer of air flowing immediately adjacent the surface of the deflector having a relatively large amount of contaminants and moisture as compared with the air flow outward thereof and whereby the contaminants and moisture droplets in the air that is permitted to enter said air passage tends to separate therefrom prior to such entry, said air passage further having a converging section leading from said inlet to accelerate the air flow in said air passage, and said air passage further having a vertically oriented circular section joined with said converting section so as to direct air flow therefrom into a circular path to decelerate the air flow in said air passage and cause contaminants and moisture droplets contained therein to move radially outward and downward and thereby separate from the air prior to introduction of the air through said air passage to the engine.

3. In combination with a vehicle having an engine and a roof mounted air deflector, an air inlet assembly providing an air passage for introducing air relatively free of contaminants and moisture to the engine, said air passage having an inlet that is positioned at a predetermined distance outward from the surface of the deflector and is oriented so as to direct air from the air stream flowing past the deflector into said air passage in a direction substantially normal to the air stream to thereby exclude from said air passage that layer of air flowing immediately adjacent the surface of the deflector having a relatively large amount of contaminants and moisture as compared with the air flow outward thereof and whereby the contaminants and moisture droplets in the air that is permitted to enter said air passage tends to separate therefrom prior to such entry, said air passage further having a converging section leading from said inlet to accelerate the air flow in said air passage, said air passage further having a vertically oriented circular section tangentially joined with said converging section for directing air flow therefrom into a circular path to decelerate the air flow in said air passage and cause contaminants and moisture droplets contained therein to move radially outward and downward and thereby separate from the air prior to introduction of the air through said air passage to the engine, and said air passage further having a collection section for collecting the contaminants and moisture droplets separated from the air in said circular section.

* * * * *

UNITED STATES PATENT AND TRADEMARK OFFICE
CERTIFICATE OF CORRECTION

PATENT NO. : 4,208,197
DATED : June 17, 1980
INVENTOR(S) : Peter Yakimowich & Paul E. Verkerke It is certified that error appears in the above-identified patent and that said Letters Patent are hereby corrected as shown below:

Column 1, line 14, after "hauling", insert -- large --.

Column 1, line 37, after "offset", insert -- outward --.

Column 1, line 68, after "introduction", insert -- assembly --.

Column 2, line 66, "in" should read -- is --.

Column 5, lines 8 & 9, "converting" should read -- converging --.

Signed and Sealed this

Fourteenth Day of October 1980

[SEAL]

Attest:

SIDNEY A. DIAMOND

Attesting Officer

Commissioner of Patents and Trademarks